(12) United States Patent
Lim et al.

(10) Patent No.: US 6,636,049 B1
(45) Date of Patent: Oct. 21, 2003

(54) DISC DRIVE POWER-UP PROCESS INCLUDING HEAD MAPPING

(75) Inventors: Teck Khoon Lim, Singapore (SG); Swee Kieong Choo, Singapore (SG); Kok Hoe Chia, Singapore (SG); Song Wee Teo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/553,076

(22) Filed: Apr. 20, 2000

Related U.S. Application Data

(60) Provisional application No. 60/162,192, filed on Oct. 28, 1999.

(51) Int. Cl.[7] .................... G01R 31/02; G11B 15/18; H02H 3/05

(52) U.S. Cl. ................. 324/537; 324/527; 714/8; 360/69

(58) Field of Search .................... 324/537, 210, 324/527, 212; 369/47.55, 47.39, 47.14; 360/281, 328, 69, 75; 714/36, 8

(56) References Cited

U.S. PATENT DOCUMENTS

| | | | | |
|---|---|---|---|---|
| 4,949,036 A | * | 8/1990 | Bezinque et al. | 324/212 |
| 5,216,655 A | | 6/1993 | Hearn et al. | 369/58 |
| 5,375,020 A | | 12/1994 | Aggarwal et al. | 360/72.1 |
| 6,182,250 B1 | * | 1/2001 | Ng et al. | 714/704 |
| 6,320,714 B1 | * | 11/2001 | Moon et al. | 360/67 |
| 6,445,653 B1 | * | 9/2002 | Ng et al. | 369/47.1 |

* cited by examiner

*Primary Examiner*—Anjan K. Deb
(74) *Attorney, Agent, or Firm*—Westman, Champlin & Kelly, P.A.

(57) ABSTRACT

A logical-to-physical head map is built upon each power up of a disc drive. After powering the controller and disc drive spindle motor, a bias current is iteratively supplied to the read heads in succession. A representation of the voltage across each read head is stored in a fault register for comparison to a threshold and a "good" or "bad" fault status is stored for each head. A logical-to-physical head map is defined based on the number of logical heads, which in turn is based on the disc drive serial number. Each of the logical heads in the logical-to-physical head map is associated to a respective one of the heads having a "good" fault status to construct the logical-to-physical head map in the controller memory.

20 Claims, 3 Drawing Sheets

DISC DRIVE POWER-UP PROCESS INCLUDING HEAD MAPPING

CROSS-REFERENCE TO RELATED APPLICATIONS

This application claims benefit of Provisional Application No. 60/162,192 filed Oct. 28, 1999 for "Intelligent Head Map Configuration For Data Storage Process" by Teck Khoon Lim, Swee Kieong Choo, Kok Hoe Chia and Song Wee Teo.

FIELD OF THE INVENTION

This invention relates to a power-up process for a disc drive, and particularly to a power-up process that includes mapping a logical-to-physical head map upon each power-up of the disc drive.

BACKGROUND OF THE INVENTION

Disc drives employ one or more recording discs to which data are written and from which data are read. A read/write transducing head is arranged to fly a design distance from each recording surface. In the case of a magnetic disc drive, each disc has two recording surfaces, so the disc drive will contain twice as many read/write heads as there are recording discs. Thus, a magnetic disc drive containing a two discs will contain four read/write heads, one for each of the four recording surfaces.

During manufacture, a head/disc unit is assembled containing a stack of magnetic recording discs mounted to a spindle motor in a housing, with an E-block rotatably mounted in the housing for operation by an actuator motor. The read/write transducing heads are mounted at the distal ends of actuator arms of the E-block and are arranged to "fly" a design distance from the confronting surface of the respective magnetic disc as the spindle motor rotates the disc stack. Prior to the present invention, the head/disc unit was then tested by writing test data onto each disc surface and reading that test data with the respective read/write head. If one or more heads fail to properly read test data from the confronting disc surface, that head/disc was considered "bad" and not available for future use. A logical-to-physical map was built to correlate the good heads to logical heads. The map was stored in the disc drive controller for use during operation of the disc drive. The disc drive was assigned a serial number that reflected the number of "good" head/disc interfaces, and was supplied to the market as a disc drive with some lesser number of disc surfaces. For example, if the drive held two disc and one head was "bad", the drive was assigned a serial number and marketed as a three-surface disc drive.

The map created during manufacture associated the good physical heads to a logical head number. The logical head number commenced with zero. Hence, for a disc drive with four heads, the logical heads were numbered 0 to 3. If, during manufacture, one of the heads was identified as "bad", the map would assign the highest logical head number as "idle" and assign a logical number between 0 and 2 to the three "good" heads. For example, if physical head 3 is "bad", the logical-to-physical head map would correlate physical heads 1, 2 and 4 to logical heads 0, 1 and 2, respectively.

The controller associated with prior disc drives would, upon start-up of the disc drive, default to the zero logical head, which is, in the example, "good" head 1. As the controller sequenced through the head, the map would note logical head 3 as idle, instructing the controller to sequence directly from logical head 2 (physical head 4) to logical head 0 (physical head 1). Similarly, the controller will directly sequence from physical head 2 (logical head 1) to physical head 4 (logical head 3) without attempting to read from bad physical head 3.

At start-up, the controller performs certain start-up routines, including testing and adjusting the bias currents for magnetoresistive (MR) read heads. If the controller detects that the physical head assigned logical head number 0 is not operating correctly, the controller would attempt corrective actions, such as adjusting the bias current for the head or the head position in relation to a data track. If those corrective actions are not effective to correct the head, the controller continues to retry corrective actions indefinitely, until the problem is solved. However, if the physical head assigned logical head zero is defective, the controller can become stalled on the "bad" head.

Hearn et al., in U.S. Pat. No. 5,216,655, attempts to overcome the problem of controller stall by copying the head map to a specific location on each disc surface, or at least the disc surfaces associated with the "good" heads. The redundancy of the information on each disc ensures that if the controller becomes stalled on a given head/disc interface, the head map table will be available for access by the controller. However, upon start-up of the disc drive, the controller must default to one of the logical heads. The Hearn et al. map assumes that all of the physical heads corresponding to logical heads are "good", so that as the controller defaults to one of the heads, it is presumed "good" and the head map is presumed to be accessible. However, if that default head is not good, the controller can not read the head map table. As a result, the controller either stalls as in the prior art, or selects a different head to retrieve the head map table from a different disc surface. Even if the controller of the Hearn et al. disc drive retrieves the head/map table from a different disc, the retrieved table is inherently defective since it assigns a logical head number to the bad head. This means that when advancing through the logical head sequence, the controller necessarily wastes effort with the bad head every time on start-up.

One problem associated with the Hearn et al. approach is that the head map table is fixed at manufacture and cannot adjust to environmental conditions, including age, that might deteriorate head differently. Should the head associated with logical head zero of the Hearn et al. become defective, the Hearn et al. controller may stall on the defective head and be subject to the same problems as the prior art disc drives.

The present invention addresses these and other problems, and offers other advantages over the prior art. More particularly, the present invention provides a start-up process by which the heads are mapped on each start-up, assuring that all logical heads of the head map table relate to "good" physical heads. Consequently, as the controller defaults to logical head zero, the controller is assured that a "good" physical head is accessed.

SUMMARY OF THE INVENTION

The present invention is directed to a power-up process for a disc drive that has a plurality of disc surfaces and a plurality of read heads confronting respective ones of the disc surfaces. Power is supplied to the disc drive spindle motor to rotate the plurality of disc surfaces and to the controller. A bias current is supplied to each read head to derive a voltage across the respective read head based on the supplied bias current and a characteristic of the read head. A level of operability of each read head is identified based on the voltage. A logical-to-physical head table is created that correlates the physical read heads to logical read heads based on head operability. The table is then stored in the controller memory. The logical-to-physical table is then used to perform read operations with the read heads by addressing the logical read head addresses in the table.

In embodiment of the process, each read head is iteratively selected, with the bias current being supplied to the read head and the level of operability identified during the respective iteration.

In another embodiment of the process, a representation of the voltage across the head is stored in a fault register. The representation in the fault register is compared to a threshold, and the fault identification is based on the stored fault.

In another embodiment of the invention, a logical-to-physical head map is defined based on a number of logical heads in the disc drive. The fault identification is stored for each head during its respective iteration. Upon completion of the sequence of iterations, the head map is defined using the stored fault identifications.

In one form of the invention a logical-to-physical head map for a disc drive is built upon power up of the disc drive. Power to the disc drive operates the disc drive spindle motor to rotate the plurality of disc surfaces and operates the controller. The read heads are iteratively selected to supply a bias current to each read head in succession. A voltage across the respective read head is based on the supplied bias current and the resistance of the read head. A representation of the voltage is stored in a fault register for comparison to a threshold to identify a "good" or "bad" fault status for the head. The fault status for each head is stored. The number of logical heads is selected based on the disc drive serial number to define the logical-to-physical head map. When the iterations are completed through all of the heads, the heads having a "good" fault status are associated to respective ones of the logical heads in the logical-to-physical head map. The logical-to-physical head map is stored in the controller memory.

DETAILED DESCRIPTION OF ILLUSTRATIVE EMBODIMENTS

Figure 1:
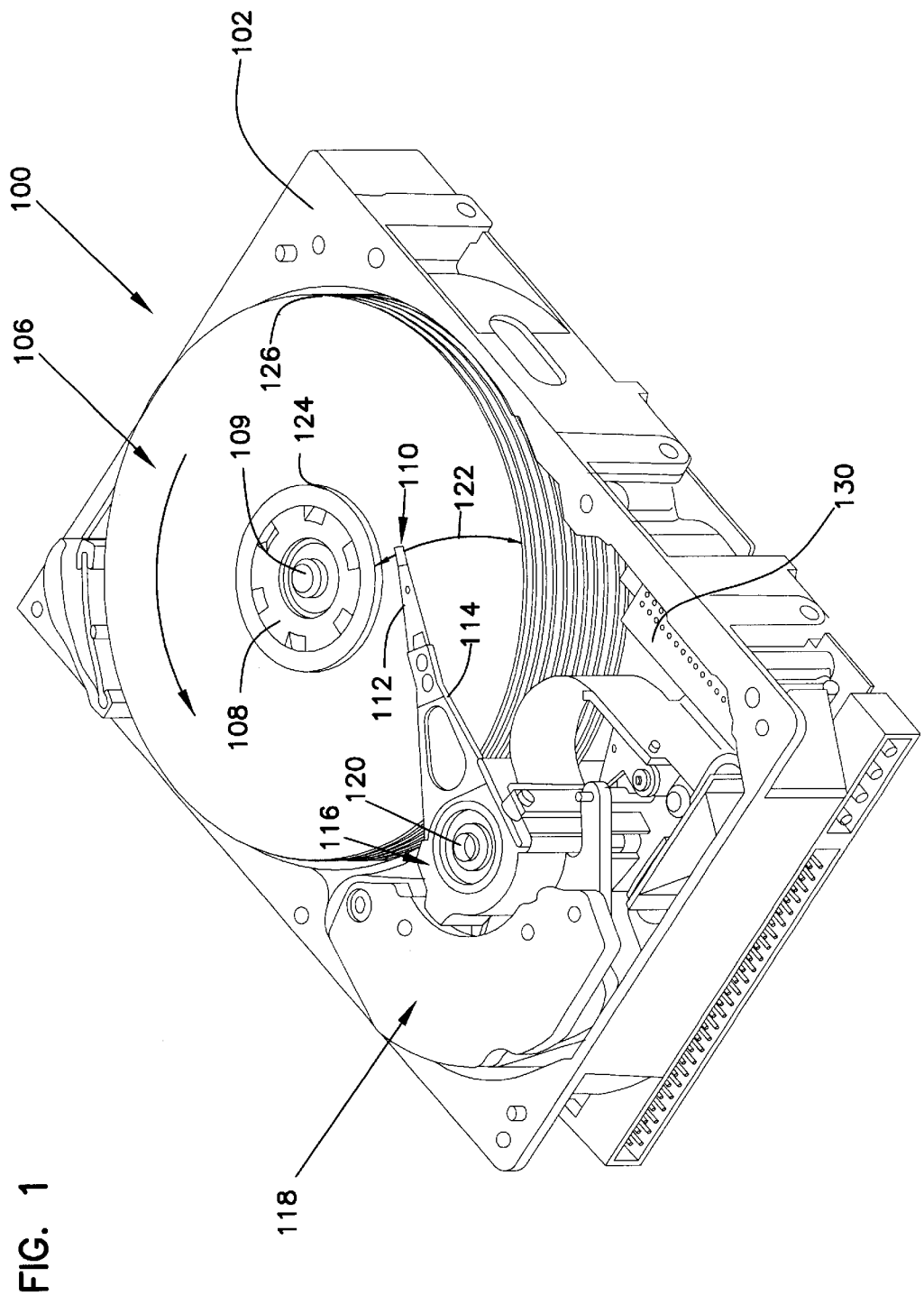
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central spindle axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
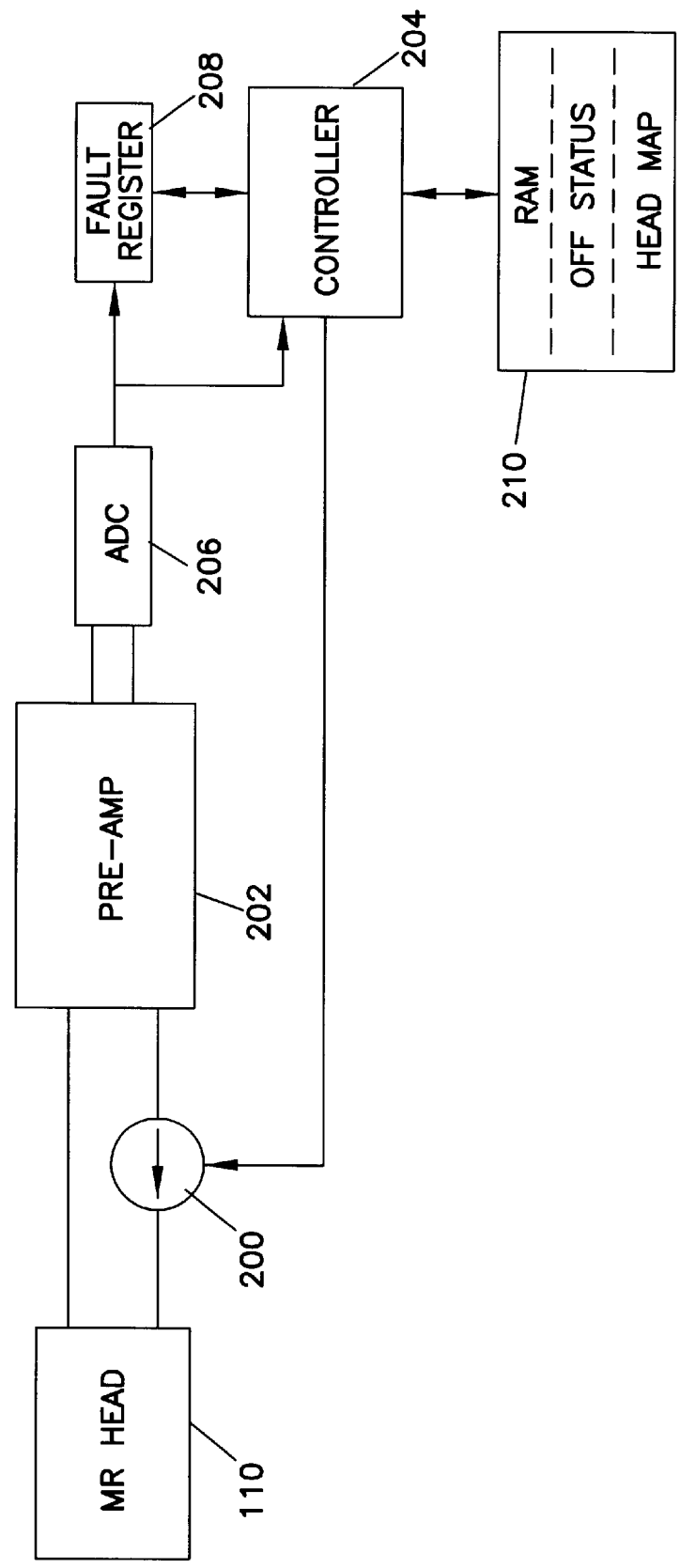
FIG. 2 is a block diagram illustrating details of the apparatus for carrying out the present invention.

FIG. 2 is a block diagram illustrating the functional aspects of the apparatus carrying out the present invention. Magnetoresistive (MR) head 110 is connected to bias current source 200, which in turn is connected to preamplifier 202. The bias current level of current from current source 200 is established by controller 204. MR head 110 is a read head whose resistance changes with magnetic flux. As magnetic discs 106 (FIG. 1) rotate, the changing magnetic flux due to data on the disc surface confronting head 110 alters the resistance of the MR head. Bias current from source 200 operates with head 110 to generate a voltage across head 110 based on the resistance of head 110. Hence, the voltage across head 110 represents data recorded on the disc. This voltage is amplified by preamplifier 202 for input to analog-to-digital converter (ADC) 206. Analog-to-digital converter 206 generates a digital signal representative of the amplitude of the voltage cross head 110, and hence representative of the bits of data on disc 106. The digital output from ADC 206 is supplied to controller 204 and is stored in fault register 208.

Controller 204 includes a random access memory (RAM) 210 that contains digital representations of threshold values identifying minimum and maximum voltage level outputs from preamplifier 202. Hence, RAM 210 identifies certain minimum performance levels for head 110. Controller 204 compares the actual performance level stored in register 208 to the minimum performance levels in RAM 210 to determine if head 210 operates to minimal levels ("good") or is faulty ("bad"). Should controller 204 determine that head 110 is faulty, controller 204 operates RAM 210 to store an "off" status flag or bit for head 110.

RAM 210 includes a table listing physical head addresses and status, as shown in Table I. Table I may be in the form of a scratch pad containing "off" flags indicating that the particular physical head is faulty or inoperative. The "off" status is set in Table I by setting the flag using the process of the present invention.

TABLE I

| Physical Head Fault Status | |
|---|---|
| Physical Head | "Off" Flag |
| 1 | |
| 2 | |
| 3 | |
| 4 | |

Table I sets forth the example of four physical heads, identified as numbers 1–4. Clearly, Table I may be of any size necessary to accommodate the number of physical heads, with the condition being that there is at least one head for each disc surface.

RAM 210 also contains a head map correlating logical-to-physical addresses of the heads.

Figure 3:
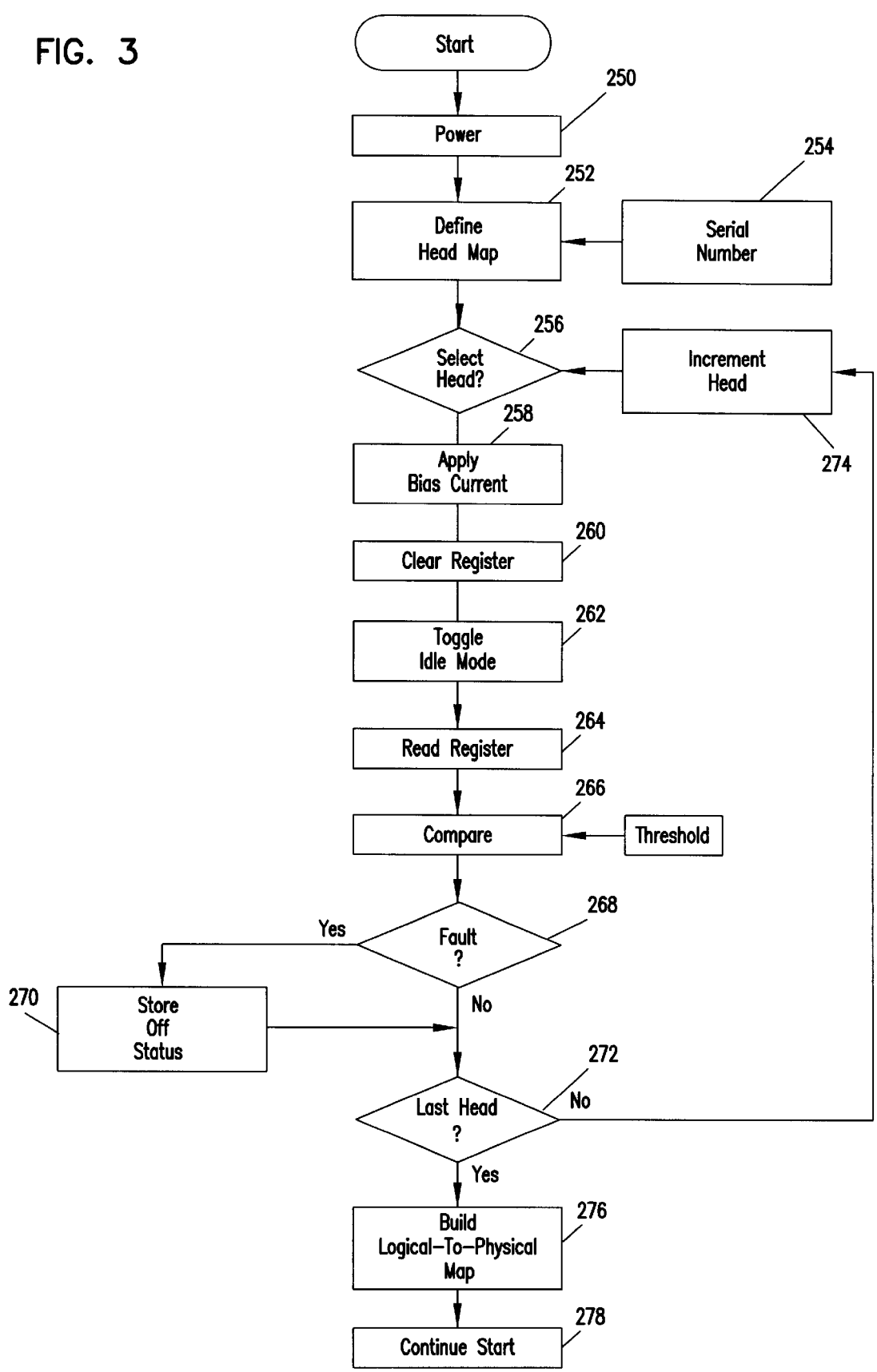
FIG. 3 is a flow diagram illustrating the process of the present invention.

FIG. 3 is a flow diagram illustrating the process of the present invention performed by the apparatus of FIG. 2. The process begins at step 250 by applying power to the disc spindle motor to rotate the spindle and discs 106 about axis 109 (FIG. 1). Power is also applied to controller 204 and the associated bias current supply 200, pre-amplifier 202, ADC 204, fault register 208 and RAM 210 (FIG. 2). At step 252, the head map is defined, based on the serial number of the drive stored at step 254. More particularly, controller 204 establishes a head map correlating logical head numbers to physical heads based on the model and serial numbers of the disc drive. For example, if the disc drive model number indicates the drive has two disc (four disc surfaces) the table established by controller 204 will contain four logical disc surface addresses, identified as addresses 0 to 3 (binary 0 to 11). If the serial number indicates that only three head/surface assemblies were indicated as "good" at the factory during manufacture, the physical head identifier associated with the highest logical address is identified with a skip code. The remaining physical head identifiers are blank or reset at step 252. The resulting skeleton head map is illustrated in Table II.

TABLE II

| Logical Head | Physical Head |
|---|---|
| 0 | |
| 1 | |
| 2 | |
| 3 | Skip |

At step 256, controller 204 selects one of the heads 110 for test. For the initial iteration, controller 204 selects physical head 1 for test. At step 258, controller 204 operates current source 200 to supply a design bias current to the selected head. At step 260, controller 204 clears fault register 208. The bias current from current source 200 operates head 110 to generate a voltage across the head, which is amplified by pre-amplifier 202 and converted to a digital signal by ADC 206. At step 262, controller 204 toggles register 208 to store the digital value in fault register 208. At step 264, the contents of fault register 208 are read by controller 204 and at step 266, the contents of register 208 are compared to threshold values stored in RAM 210. The threshold values identify the minimal operating conditions for a head based on the voltage generated by bias current source 200. Base on the results of the comparison at step 266, controller 204 identifies a "good" or "bad" condition of the head at step 268. If controller 204 identifies a "bad" head 110, controller 204 operates RAM 210 at step 270 to update Table I to identify the physical head as faulty, such as by setting a flag as previously described. At step 272, controller determines if the head tested was the last head of the sequence (e.g., physical head 4). This determination is based on either the controller not finding the head to be faulty at step 268, or successful storage of the fault status at step 270. If the head just tested was not the last head of the sequence, the physical head identification is incremented at step 274 by controller 204 and the next head, such as physical head 2, is selected at step 256. The process repeats through several iterations, until, at step 272, controller 204 determines that the head under current test, is the last head of the sequence. At step 276, controller 204 builds the logical-to-physical head map based on the stored "off" status in Table I of RAM 210.

For example, if controller 204 identifies that physical head 2 is faulty, Table I will contain flags indicating the status of each physical head, as illustrated in Table III.

TABLE III

Completed Physical Head Fault Status

| Physical Head | "Off" Flag |
|---|---|
| 1 | 0 |
| 2 | 1 |
| 3 | 0 |
| 4 | 0 |

Based on the completed physical head fault status Table III, controller 204 builds the logical-to physical head map (as shown in Table IV) at step 278.

TABLE IV

Physical Head 2 Off

| Logical Head | Physical Head |
|---|---|
| 0 | 1 |
| 1 | 3 |
| 2 | 4 |
| 3 | Skip |

After building the head map at step 276, controller 204 continues at step 278 through its additional and final start-up procedures. For example, the controller may perform additional tests to select an optimal bias current for each logical head 0–3 (physical heads 1, 3 and 4 in the example), track centering procedures, as well as other procedures well known in the art.

In use of the disc drive, controller 204 receives command signals from the host computer (not shown) and selects logical heads for storage and retrieval of data. Using Table IV, the controller automatically selects a "good" head. At any given sequencing of the heads by controller 204, only good heads are accessed, so the controller will not stall on a bad head, as in the prior art.

The present invention thus provides a power-up process for disc drive 100. At step 250, power is supplied to the disc drive spindle motor to rotate the plurality of disc surfaces 106 and to operate a controller 204. At step 258, bias current supply 200 supplies bias current to each read head 110 to derive a voltage across the respective read head based on the supplied bias current and the resistance of the read head. Controller 204 identifies a level of operability at step 268 for each read head 110 based on the voltage, thereby creating, at step 276, Table IV that correlates the physical read heads to the logical read heads based on the operability. The table is stored in the controller memory 210 as the logical-to-physical head map.

The process is carried out iteratively by controller 204 through the loop through the incrementing of heads at step 274. Hence, the read heads 110 are iteratively selected in a sequence, and the steps of supplying bias current and identifying a level of operability for each read head 110 is accomplished during respective iterations.

The present invention also provides a process for building a logical-to-physical head map for disc drive 100 upon power up of the disc drive. The disc drive has a plurality of read heads 110 for reading data from confronting ones of a plurality of disc recording surfaces 106. The process includes supplying power at step 250 to disc drive 100 to operate the disc drive spindle motor to rotate the plurality of disc surfaces 106 and to operate the controller 204. The read heads are selected at step 256. The selection is iteratively advanced through the entire sequence at the end of each head test at step 274. During each iteration, a bias current is supplied at step 258 to the selected read head by supply 200 to derive a voltage across the head based on the supplied bias current and the resistance of the read head. A digital representation of the voltage is stored in fault register 208 at step 262, and the stored representation in register 208 is compared at step 266 by controller 204 to a threshold value to identify a "good" or "bad" fault status for the head. The identified fault status for the head is stored in RAM 210 by setting a flag in Table I, as described in connection with Table III.

The number of logical heads is selected, based on the serial number of the disc drive stored in RAM 210 and accessed in step 254. The logical-to-physical head map is defined at step 252 based on the number of logical heads in the disc drive. Upon iteration through all of the heads is completed at step 272, the physical heads having a "good" fault status to are associated to respective ones of the logical heads in the logical-to-physical head map in RAM 210 at step 276, with the RAM storing the physical-to-logical head map.

Using the present head map created on power up, the read and write operations of the disc drive are performed using the logical head numbers which are associated to the physical heads with the head map stored in RAM 210.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the start-up process while maintaining substantially the same functionality without departing from the scope and spirit of the present invention. In addition, although the preferred embodiment described herein is directed to a start-up process for a magnetic disc drive system, it will be appreciated by those skilled in the art that the teachings of the present invention can be applied to other systems, such as optical disc drive systems, without departing from the scope and spirit of the present invention.

What is claimed is:

1. A process comprising steps of:
   (a) supplying a bias current to at least one transducer;
   (b) deriving a voltage across the at least one transducer based on the supplied bias current and a characteristic of the transducer;
   (c) identifying a fault status of the at least one transducer based on the voltage derived in step (b); and
   (d) creating a table that correlates logical transducer addresses to physical transducer addresses of only those transducers having an acceptable fault status.

2. The process of claim 1, further including:
   (e) performing read operations with the transducers by addressing the logical transducer addresses in the table.

3. The process of claim 1, wherein step (a) includes:
   iteratively selecting each transducer of a plurality of transducers,
   and performing steps (b) and (c) on the respective transducer during the respective iteration.

4. The process of claim 3, further including:
   (e) performing read operations with the transducers by addressing the logical transducer addresses in the table.

5. The process of claim 3, wherein step (c) is performed by steps of:
   (c1) storing a representation of the voltage derived in step (b) in a fault register,
   (c2) comparing the representation stored in step (c1) to a threshold, and
   (c3) identifying a fault based on step (c2).

6. The process of claim 5, wherein step (d) includes:
   (d1) defining a logical-to-physical map based on a number of logical transducers,
   (d2) during each iteration, storing the fault identified in step (c3),
   (d3) identifying completion of the sequence of iterations, and
   (d4) completing the map defined in step (d1) using the faults stored in step (d2).

7. The process of claim 6, wherein there are at least as many logical transducers as there are physical transducers and each physical transducer address is associated with one logical transducer address, and step (d) further includes:
   (d5) assigning a skip code to each logical transducer address that is not associated with a physical transducer address of a transducer having an acceptable fault status.

8. The process of claim 5, wherein there are at least as many logical transducers as there are physical transducers and each physical transducer address is associated with one logical transducer address, and step (d) further includes:
   assigning a skip code to each logical transducer address that is not associated with a physical transducer address of a transducer having an acceptable fault status.

9. The process of claim 3, wherein step (d) includes:
   (d1) defining a logical-to-physical map based on a number of logical transducers,
   (d2) during each iteration, storing the fault status identified in step (c),
   (d3) identifying completion of the sequence of iterations, and
   (d4) completing the map defined in step (d1) using the faults stored in step (d2).

10. The process of claim 9, wherein there are at least as many logical transducers as there are physical transducers and each physical transducer address is associated with one logical transducer address, and step (d) further includes:
    (d5) assigning a skip code to each logical transducer address that is not associated with a physical transducer address of a transducer having an acceptable fault status.

11. The process of claim 1, wherein step (c) is performed by steps of:
    (c1) storing a representation of the voltage derived in step (b) in a fault register,
    (c2) comparing the representation stored in step (c1) to a threshold, and
    (c3) identifying a fault based on step (c2).

12. The process of claim 11, wherein step (d) includes:
(d1) defining a logical-to-physical map based on a number of logical transducers,
(d2) during each iteration, storing the fault identified in step (c3),
(d3) identifying completion of the sequence of iterations, and
(d4) completing the map defined in step (d1) using the faults stored in step (d2).

13. The process of claim 12, wherein there are at least as many logical transducers as there are physical transducers and each physical transducer address is associated with one logical transducer address, and step (d) further includes:
(d5) assigning a skip code to each logical transducer address that is not associated with a physical transducer address of a transducer having an acceptable fault status.

14. The process of claim 1, wherein step (d) includes:
(d1) defining a logical-to-physical map based on a number of logical transducers,
(d2) during each iteration, storing the fault identified in step (c),
(d3) identifying completion of the sequence of iterations, and
(d4) completing the map defined in step (d1) using the faults stored in step (d2).

15. The process of claim 14, further including:
(e) performing read operations with the transducers by addressing the logical transducer addresses in the table.

16. The process of claim 14, wherein there are at least as many logical transducers as there are physical transducers and each physical transducer address is associated with one logical transducer address, and step (d) further includes:
(d5) assigning a skip code to each logical transducer address that is not associated with a physical transducer address of a transducer having an acceptable fault status.

17. The process of claim 1, wherein there are at least as many logical transducers as there are physical transducers and each physical transducer address is associated with one logical transducer address, and step (d) further includes:
assigning a skip code to each logical transducer address that is not associated with a physical transducer address of a transducer having an acceptable fault status.

18. A process comprising steps of:
(a) identifying a fault status for each transducer of a plurality of transducers;
(b) selecting a number of logical transducers based on an identifier;
(c) associating logical transducers in a logical-to-physical map to respective ones of the physical transducers having an acceptable fault status; and
(d) assigning a skip code to each logical transducer in the map not associated to a physical transducer having an acceptable fault status.

19. The process of claim 18, further including:
(e) performing read operations with the transducers by addressing logical transducer addresses in the map.

20. The process of claim 18, wherein step (a) is comprises, for each transducer, steps of:
(a1) supplying a bias current to the transducer,
(a2) deriving a voltage across the transducer based on the supplied bias current and a characteristic of the transducer,
(a3) storing a representation of the voltage derived in step (a2) in a fault register,
(a4) comparing the representation stored in step (a3) to a threshold, and
(a5) identifying a fault status for the transducer based on step (a4).

* * * * *